United States Patent [19]

Frey et al.

[11] Patent Number: 5,069,886

[45] Date of Patent: Dec. 3, 1991

[54] PROCESS AND INSTALLATION FOR THE RECOVERY OF AMMONIA DURING THE SEPARATION OF NITROGEN OXIDE FROM WASTE GASES

[76] Inventors: Ruedi Frey, Lägernstrasse 1, Bassersdorf; Hans Rüegg, Bremgartenstrasse 55, Wohlen, both of Switzerland

[21] Appl. No.: 590,436

[22] Filed: Sep. 26, 1990

Related U.S. Application Data

[63] Continuation of Ser. No. 107,439, Oct. 13, 1987, abandoned.

[30] Foreign Application Priority Data

Oct. 13, 1986 [CH] Switzerland ............... 4073/86

[51] Int. Cl.⁵ .................. C01C 1/10; C01C 1/12
[52] U.S. Cl. ..................... 423/237; 55/46;
55/70; 55/84; 422/148; 422/169; 422/171;
422/172; 423/235; 423/239
[58] Field of Search ............ 422/169-173,
422/148; 55/70, 68, 84, 46; 423/235, 237, 239

[56] References Cited

U.S. PATENT DOCUMENTS

| | | | |
|---|---|---|---|
| 3,126,945 | 3/1964 | Kuhner | 55/14 X |
| 3,344,585 | 10/1967 | Hollowel | 55/70 |
| 3,798,308 | 3/1974 | Tatterson | 423/237 X |
| 3,884,162 | 5/1975 | Schuster | 55/124 |
| 3,961,020 | 6/1976 | Seki | 423/239 |
| 4,003,711 | 1/1977 | Hishinuma et al. | 423/239 X |
| 4,093,544 | 6/1978 | Ross | 55/70 X |
| 4,302,431 | 11/1981 | Atsukawa et al. | 422/172 X |
| 4,547,293 | 10/1985 | King et al. | 55/70 X |
| 4,758,250 | 7/1988 | Laciak et al. | 55/70 X |

Primary Examiner—Robert J. Warden
Assistant Examiner—Amalia Santiago

[57] ABSTRACT

Process and apparatus wherein nitrogen oxides $NO_x$ contained in waste gases produced by combustion of fossil fuels in a firing plant are removed by reacting the waste gases with ammonia $NH_3$ to reduce the nitrogen oxides to elementary nitrogen $N_2$; subjecting the waste gases after being so reacted to wet waste gas cleaning whereby the washing water removes the unreacted ammonia (slip) from the waste gas to produce slip enriched washing water; raising the pH value of the slip enriched washing water to a value of more than 10, introducing air into the pH raised slip enriched washing water to remove the slip from the water and produce an air-slip mixture and recycling the slip into the furnace to react with waste gases to lower the amount of ammonia discharged into the atmosphere.

9 Claims, 2 Drawing Sheets

PROCESS AND INSTALLATION FOR THE RECOVERY OF AMMONIA DURING THE SEPARATION OF NITROGEN OXIDE FROM WASTE GASES

This is a continuation of copending application Ser. No. 07/107,439 filed on Oct. 13, 1987 abandoned.

BACKGROUND OF THE INVENTION

The present invention relates to both process and apparatus for the recovery of ammonia during the separation of nitrogen oxides $NO_x$ from the fuel or waste gases obtained during the combustion of flammable materials, particularly fossil fuels, in a firing plant wherein a reducing gas, preferably ammonia $NH_3$ is introduced into the waste gas flow in a reaction zone and through which the nitrogen oxide gases are reduced to elementary nitrogen $N_2$, and wherein the waste gas flow undergoes wet waste gas cleaning performed after the reaction phase and the washing water removes the unreacted ammonia, called slip, from the waste gas.

Waste or flue gases contain to a greater or lesser extent oxides of nitrogen $NO_x$, particularly nitrogen monoxide NO in amounts exceeding 90%, which is formed in air when fuels of any type, but in particular fossil fuels are burned. If the flue gases, before undergoing cleaning, are given off to the atmosphere nitrogen dioxide $NO_2$ is formed from the nitrogen monoxides under the influence of oxygen from the air an/or from the flue gases. When the nitrogen dioxide, which is readily water-soluble gas, is exposed to moisture such as rain, the gas is washed out as nitrous acid $HNO_2$ or nitric acid $HNO_3$ and consequently not inconsiderably contributes to the formation of acid rain. The ozone content of the atmosphere is also increased by a photochemical reaction of nitrogen oxides $NO_x$.

Various process are known for separating nitrogen oxides from waste gases. The most frequently used processes employ ammonia for this purpose which is introduced into the waste gas flow, reacting there with the nitrogen oxides and reducing them to elementary nitrogen $N_2$.

In one known process, called the SNCR process (Selective Noncatalytic Reduction Process), cf. EP 79 171, ammonia gas is introduced into the furnace chamber of a firing plant. A temperature of 700° to 1100° C. is required to permit the reduction of the nitrogen oxides.

In another known process, called the SCR process (Selective Catalytic Reduction Process), as disclosed for example in U.S. Pat. No. 3,970,739, the ammonia is admixed with the waste gas in a reaction chamber provided with suitable catalysts, temperature of 150° to 700° C. being maintained in the reaction chamber.

It is known that, in both these processes, some ammonia will not react with the nitrogen monoxide. The higher the desired degree of separation, the larger the unreacted amount of ammonia. The unreacted amount can exceed the amounts which are permitted by existing regulations to pass into the atmosphere. Thus, the nitrogen oxide separation efficiency of the known processes is limited by the amount of unreacted ammonia which can be discharged into the atmosphere.

SUMMARY OF THE INVENTION

It is an object of the present invention to so develop a process of the aforementioned type, that a high nitrogen oxide separation efficiency, accompanied by a low ammonia consumption is obtained without exceeding the amount of unreacted ammonia, which under existing regulation can be discharged the atmosphere.

Another object of the invention is to provide a process wherein the pH-value of the washing water, which in the case of wet waste gas cleaning is enriched by ammonia $NH_3$ and ammonium $NH_4$, is raised to more than 10 and then the ammonia is expelled by air introduced into the washing water.

Still another object is to provide a firing plant with a furnace and a boiler, wherein an optimum recovery of ammonia during the separation of nitrogen oxides from the waste gases produced during the combustion of fossil fuels and other materials can be obtained.

Thus, in accordance with the inventive process wherein nitrogen oxides $NO_x$ are contained in waste gases produced by combustion of fossil fuels in a firing plant, the following steps are included: reacting the waste gases with ammonia $NH_3$ to reduce the nitrogen oxides to elementary nitrogen $N_2$ subjecting the waste gases after being so reacted to wet waste gas cleaning whereby; the washing water removes the unreacted ammonia (slip) from the waste gas to produce slip enriched washing water; raising the pH value of the slip enriched washing water to a value of more than 10; and introducing air into the pH raised slip enriched washing water to remove the slip from the water and produce an air-slip mixture.

Apparatus wherein nitrogen oxides $NO_x$ are contained in waste gasses produced by combustion of fossil fuels in a firing plant in accordance with the invention, comprises first means to react the waste gases with ammonia $NH_3$ to reduce the nitrogen oxides to elementary nitrogen $N_2$; second means to subject the waste gases after being so reacted to wet waste gas cleaning whereby the washing water removes the unreacted ammonia (slip) from the waste gas to produce slip enriched washing water; third means to raise the pH value of the slip enriched washing water to a value of more than 10: and fourth means to introduce air into the pH raised slip enriched washing water to remove the slip from the water and produce an air-slip mixture.

All of the foregoing and still further objects and advantages of the invention will either be explained or will become apparent to those skilled in the art when this specification is studied in conjunction with the drawings and detailed description which follows.

DETAILED DESCRIPTION OF THE PREFERRED EMBODIMENTS

Figure 1:
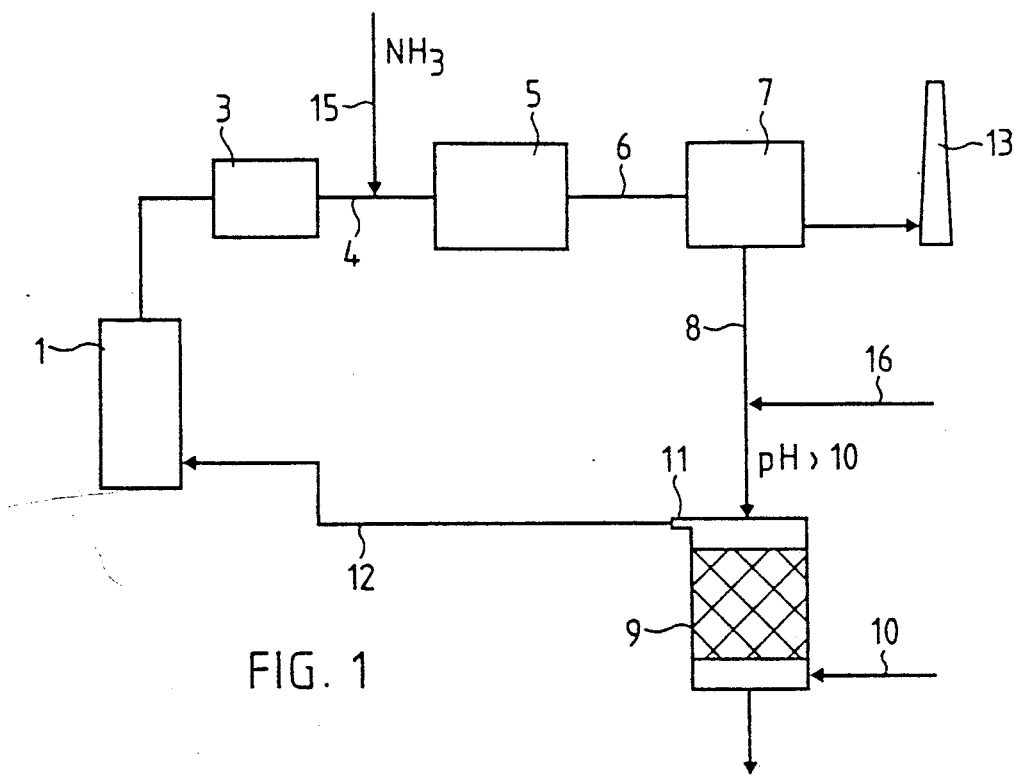
FIG. 1 illustrates a first embodiment of the invention.

Referring now to FIG. 1, a furnace 1 burns flammable materials, particularly fossil fuels. The waste or flue discharged from the furnace is fed to a boiler 3. Ammonia gas $NH_3$ is introduced by means of a feed line 15 into a discharge line 4 from the boiler. The gas mixture is fed into a reaction chamber 5 such as is used in the SCR process, in which nitrogen oxide separation takes place, i.e. the reduction of the nitrogen oxides by ammonia.

The waste gases leaving the reaction chamber 5 which contain unreacted ammonia (slip) pass via a line 6 into a wet washing or cleaning plant 7, in which the unreacted ammonia is dissolved in the washing water. The ammonia combines with the acid constituents of the water to give ammonium salts.

In order to prevent that ammonia or ammonium compounds to pass via the washing water out of the wet cleaning plant 7 and into the environment, the pH-value of the ammonium ion-enriched washing water from the wet cleaning plant 7 is raised to a value higher than 10, by adding lime through a line 16. Thus, the reaction equilibrium in the following equation is markedly displaced to the right:

$$NH_4 + OH \rightleftharpoons NH_3 + H_2O$$

Thus, the separated ammonia once again appears in ammonia form in the solution.

The dissolved ammonia is desorbed in a further process stage and is expelled from the washing water as gas. The undissolved ammonia is subjected to a process called "stripping" (cf. Ullmann Enzkyklopaedie der Technischen Chemie, Vol. 2, 1972, pg. 587). In this process, an intimate contact is brought about between the washing water and the air, so that the slip can be transferred from the washing water into the air. For this purpose, the washing water is supplied by a connecting line 8 to a stripping column 9, which is provided with an air feed line 10 and an air outlet 11, which is connected to a feed line 12 connected to the furnace 1. Thus, the slip contained in the washing water is mixed with air, and this mixture is directly reintroduced into furnace 1 as combustion air, e.g. as a secondary air. The waste gases leaving the wet cleaning plant 7 can be discharged into the atmosphere through a stack or chimmey 13.

Figure 2:
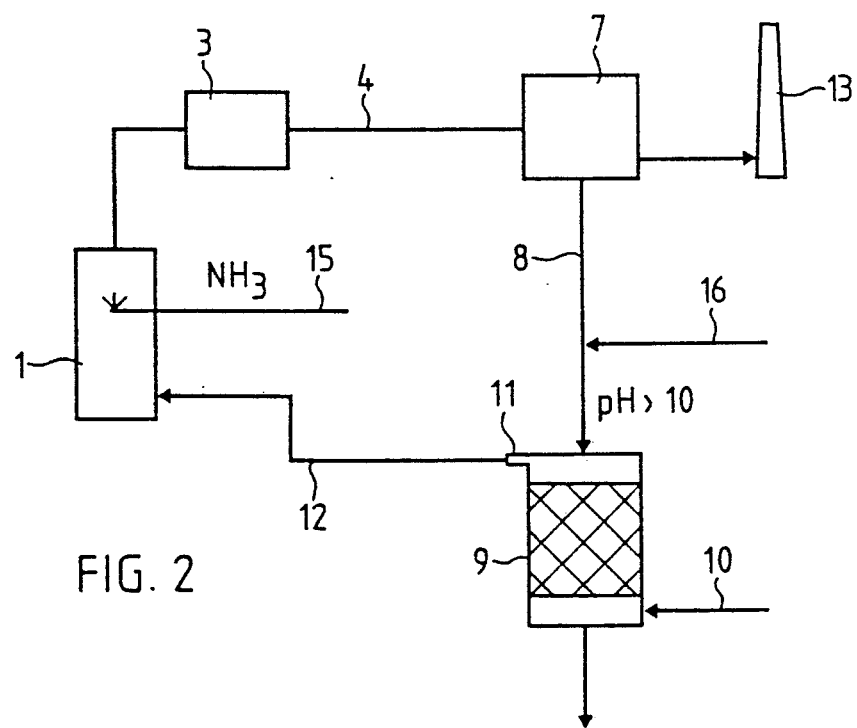
FIG. 2 illustrates a second embodiment of the invention.

Whereas the arrangement of FIG. 1, in accordance with the SCR process, requires a reaction chamber 5, upstream of whose intake the ammonia is supplied through the feed line 15, the arrangement of FIG. 2, in accordance with the SNCR process, requires no separate reaction chamber. The ammonia is in this case passed directly through the ammonia feed line 15 into furnace 1 or boiler 3 wherein the ammonia reacts with the waste gases connecting line 8, stripping column 9 with air feed 10 and air outlet 11, as well as the ammonia return line 12 are the same as employed with the arrangement of FIG. 1.

Figure 3:
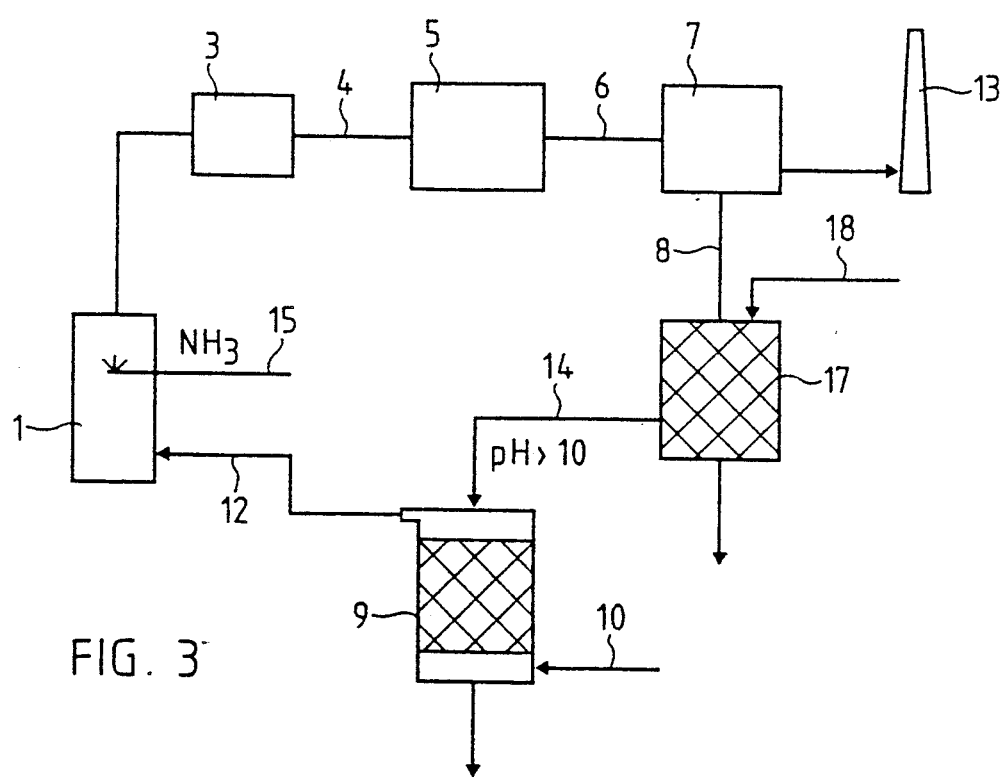
FIG. 3 illustrates a third embodiment of the invention.

As shown in FIG. 3 the ammonia separated in the wet cleaning plant 7 can remain in ammonia form in the solution, in that the ammonium is separated from the washing water by means of a selective ion exchanger 17, which is flushed back with a suitable solution, as for example lime-sodium chloride introduced through a feed line 18, and the flushing back solution is led through a line 14 to the stripping column 9, the pH-value of said solution being raised to a value higher than 10 in accordance with the preceding example.

As a result of the process performed in accordance with the apparatus shown in FIGS. 1, 2 and 3, the nitrogen oxide stage can be operated with a high excess of unreacted ammonia, so that the nitrogen oxide separation efficiency can be substantially increased. In addition, the excess ammonia which has not reacted with the nitrogen oxides in the wet waste gas washer or cleaner, through the separation and return to the furnace 1, can be reused as in the SNCR process, which once again contributes to the nitrogen oxide reduction and not inconsiderably decreases the ammonia consumption of the installation.

While the invention has been described with detailed reference to the drawings, it will be obvious to those skilled in the art that man modifications and changes can be made within the scope and sphere of the invention as defined in the claims which follow.

What is claimed is:

1. A process wherein nitrogen oxides $NO_x$ contained in waste gases produced by combustion of fossil fuels in a furnace are reduced with ammonia ($NH_3$) to elemental nitrogen $N_2$ and the reducing agent ($NH_3$) is recycled comprising the steps of:

providing a furnace;

reacting the waste gases produced by combustion with ammonia $NH_3$ to reduce the nitrogen oxides to elementary nitrogen $N_2$;

subjecting the waste gases after being so reacted to waste gas cleaning whereby washing water removes the unreacted ammonia which is known as slip from the waste gas to produce slip-enriched washing water;

raising the pH value of the slip enriched washing water to a value of more than 10;

introducing air into the pH-raised slip-enriched water to remove the slip from the water and produce an air-slip mixture; and recycling the air-slip mixture into the furnace to react with waste gases produced by combustion to reduce nitrogen oxides and thereby lower the amount of ammonia discharged into the atmosphere.

2. The process of claim 1, wherein the air and the pH-raised slip-enriched washing water are mixed together in a stripping column and the air-slip mixture is discharged from said column.

3. The process of claim 2, wherein the pH is raised by introducing lime into the slip-enriched washing water.

4. The process of claim 2, wherein the pH is raised by feeding the slip-enriched washing water and a lime and sodium chloride solution as inputs to an ion exchanger, the pH-raised slip-enriched water appearing at the output of the exchanger.

5. The process of claim 2, wherein the waste gas-ammonia reaction takes place in a reaction chamber.

6. Apparatus wherein nitrogen oxides $NO_x$ contained in waste gases produced by combustion of fossil fuels in a furnace are reduced with ammonia ($NH_3$) to elemental nitrogen $N_2$ and the reducing agent ($NH_3$) is recycled comprising:

a furnace means to react the waste gases produced by combustion with ammonia $NH_3$ to reduce the nitrogen oxides to elementary nitrogen $N_2$;

means to subject the waste gases after being so reacted to waste gas cleaning whereby washing water removes the unreacted ammonia which is known as slip from the waste gas to produce slip enriched washing water;

means to raise the pH value of the slip-enriched washing water to a value of more than 10;

means to introduce air into the pH-raised slip-enriched water to remove the slip from the water and produce an air-slip mixture; and means to recycle the air-slip mixture into the furnace to react with waste gases produced by combustion to reduce nitrogen oxide and thereby lower the amount of ammonia discharged into the atmosphere.

7. The apparatus of claim 6, wherein the means for removing the slip from the water includes a stripping column.

8. The apparatus of claim 7, wherein the wet waste gas cleaning means includes a wet cleaning means disposed between the furnace and the stripping column.

9. A process for burning flammable material in a furnace which results in the production of toxic waste gas, wherein nitrogen oxides $NO_x$ contained in the waste gases are reduced with ammonia ($NH_3$) to elemental nitrogen $N_2$ and the reducing agent ($NH_3$) is recycled comprising the steps of:
- (a) providing a furnace;
- (b) mixing the waste gas with ammonia to produce a waste gas-ammonia mixture;
- (c) reacting the waste gas-ammonia mixture in a reaction chamber to separate nitrogen oxides from the mixture, which results in a discharge having unreacted ammonia, known as slip;
- (d) dissolving the slip in washing water having an acid constituent so the unreacted ammonia in the slip combines with the acid to produce ammonium salts and slip-enriched washing water;
- (e) raising the pH value of the slip-enriched washing water to a value of more than 10 by combining it with lime to prevent dissolved ammonia from passing from the slip-enriched washing water into the surrounding environment;
- (f) mixing the slip-enriched washing washer with fresh air to strip undissolved ammonia therefrom, which results in an undissolved ammonia-air mixture; and
- (g) recycling the undissolved ammonia-air mixture into the furnace to prevent undesirable discharge of toxic ammonia into the environment.

* * * * *